United States Patent [19]

Amner

[11] Patent Number: 5,065,920
[45] Date of Patent: Nov. 19, 1991

[54] STOWAGE TRAY

[75] Inventor: John A. Amner, Rochford, United Kingdom

[73] Assignee: Ford Motor Company, Dearborn, Mich.

[21] Appl. No.: 506,586

[22] Filed: Mar. 28, 1990

Related U.S. Application Data

[63] Continuation of Ser. No. 290,121, Dec. 27, 1988, abandoned.

[30] Foreign Application Priority Data

Jan. 22, 1988 [GB] United Kingdom ............... 8801426

[51] Int. Cl.⁵ .............................................. B60R 7/00
[52] U.S. Cl. ................... 224/275; 224/281; 224/282; 312/348; 312/323
[58] Field of Search ............ 224/275, 281, 282, 42.41, 224/42.46 R, 42.44; 297/192; 296/37.15; 16/124; 312/270, 322, 323, 348, 242, 330 R

[56] References Cited

U.S. PATENT DOCUMENTS

| | | | |
|---|---|---|---|
| 958,203 | 5/1910 | Weiss | 312/348 |
| 1,631,811 | 6/1927 | Guenther | 297/192 |
| 2,242,903 | 5/1941 | Crimmel | 312/270 |
| 2,245,882 | 6/1941 | Visser | 312/348 |
| 3,026,141 | 3/1962 | Welles . | |
| 3,131,813 | 5/1964 | Jensen . | |
| 3,321,237 | 5/1967 | Gangell . | |
| 3,606,112 | 9/1971 | Cheshier . | |
| 3,623,683 | 11/1971 | Bennett | 297/192 |
| 3,625,347 | 12/1971 | Trammell, Jr. . | |
| 3,722,975 | 3/1973 | Taylor | 312/348 |
| 3,815,799 | 6/1974 | Trammel, Jr. | 206/19.5 R |
| 4,061,395 | 12/1977 | Boole | 297/192 |
| 4,441,771 | 4/1984 | Roesler | 312/323 |
| 4,501,457 | 2/1985 | Pond | 312/314 |

FOREIGN PATENT DOCUMENTS 3114509A 11/1982 Fed. Rep. of Germany .
635187 4/1950 United Kingdom .
682802 11/1952 United Kingdom .

*Primary Examiner*—Linda J. Sholl
*Attorney, Agent, or Firm*—Daniel M. Stock; Roger L. May

[57] ABSTRACT

A tray or drawer for mounting beneath a seat in a motor vehicle is mounted on rails so that it can slide out forwards and then tilt to allow access to the interior space of the tray.

7 Claims, 3 Drawing Sheets

STOWAGE TRAY

This application is a continuation of application Ser. No. 07/290,121, filed Dec. 27, 1988 now abandoned.

BACKGROUND OF THE INVENTION

This invention relates to a stowage tray, particularly an underseat stowage tray for use in a motor vehicle.

Underseat stowage trays are known, but generally their storage capacity is limited and the accessibility of objects stored in the tray is poor.

SUMMARY OF THE INVENTION

It is accordingly an object of the present invention to provide an underseat stowage tray that has increased storage capacity and improved accessibility.

According to a feature of the present invention, there is provided an underseat stowage tray arrangement for use in a motor vehicle including a tray and a pair of rails, the rails being adapted to be secured below a vehicle seat and to receive opposite sides of the tray so that the tray is guided by the rails for backwards and forwards sliding movement, and wherein the tray and the rails are so formed that once the tray has been slid forward, the front edge of the tray can be tipped downwards to facilitate loading and unloading of the tray.

According to another feature of the present invention, the rails are preferably made of plastic material so that they can be heat staked to the underside of a seat which has a plastic base.

According to yet another feature of the present invention, the tray itself is also preferably of plastic, and the contacting surfaces of the tray and of the rails carry formations to prevent the tray's rattling in the rails.

According to yet another feature of the present invention, a spring-loaded engagement is provided which may be manually operated to allow the tray to be completely removed from the rails, when desired.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
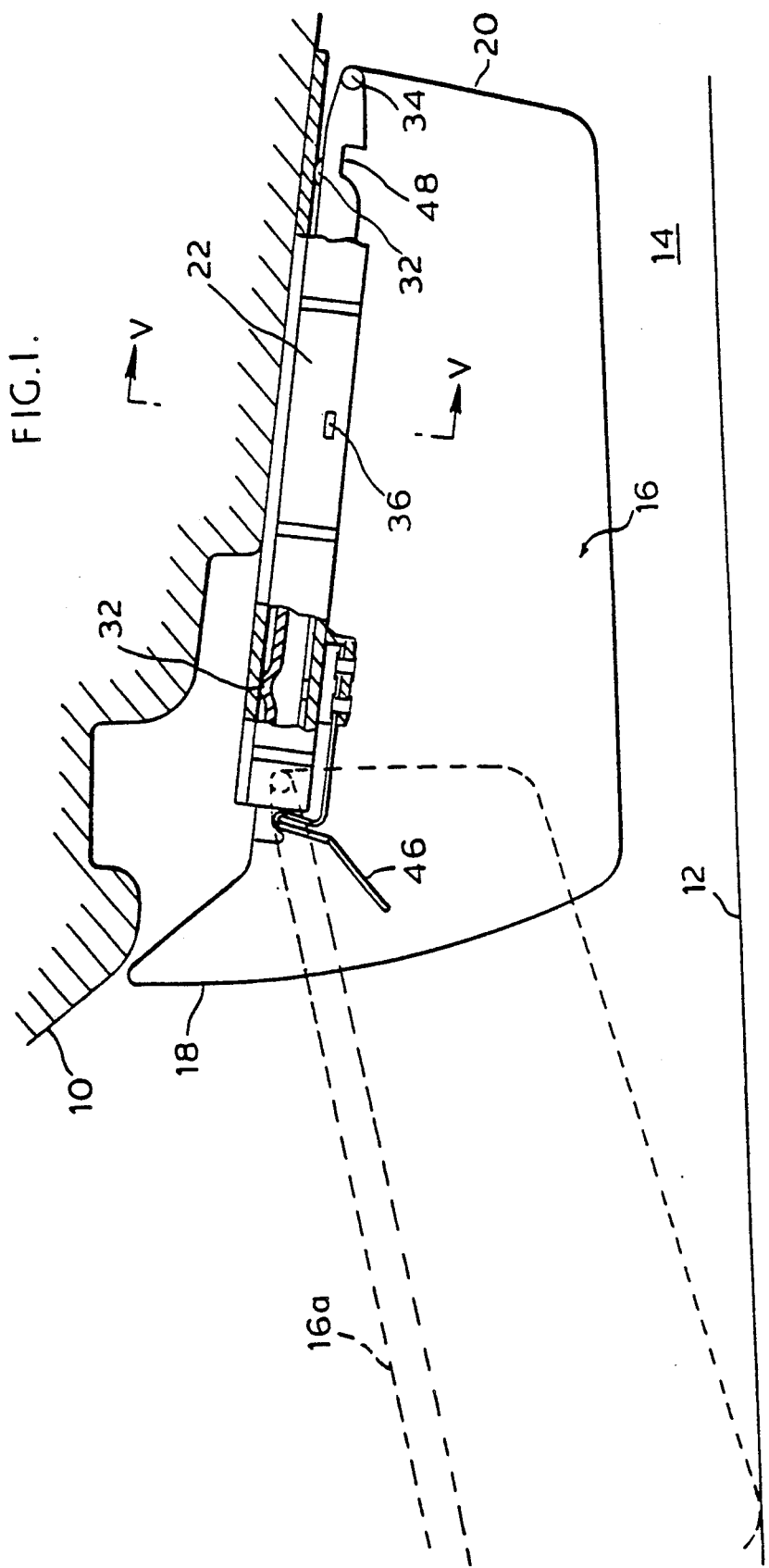
FIG. 1 is a side view of a tray in position beneath the seat, with a part of a rail broken away and another part in section to illustrate details of the construction.

FIG. 1 shows the underside of a seat 10 in a car, where the floor of the car is indicated at 12. Between the underside of the seat 10 and floor 12 is a space 14, and a stowage tray 16 is mounted in this space. The tray 16 has a front 18 and a rear 20 and is supported on rails 22, the rails being secured to the underside of the seat 10.

The rails 22 allow the tray 16 to be opened by sliding forwardly and and shut by sliding rearwardly; and in the extreme forward position of the tray 16, it can be tipped to take up the Position shown in dotted lines at 16a.

The fact that the tray 16 slides forward and then tips as shown provides good accessibility to the contents of the tray 16 and in particular since the floor of the tray 16 then slopes downward, the contents of the tray 16 will tend to roll or slide forward and become accessible.

Where the underside or base 11 of the seat 10 is formed by a plastic tray, and the rails 22 are also of plastic material, then the rails 22 can be secured to the seat 10 by a welding or heat staking process.

Figure 2:
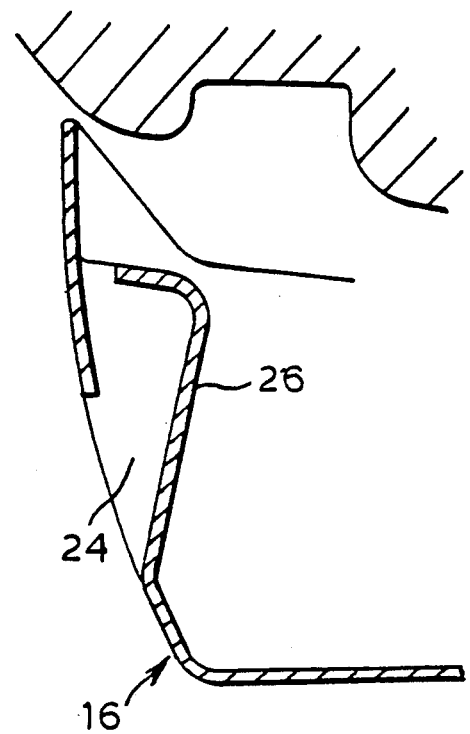
FIG. 2 is a partial cross-sectional view of the front part of a tray.

As may be seen in FIG. 2, the tray 16 has a grip 24 formed in its front face by cutting out an aperture in the front face and providing a closure wall behind the aperture. This can be done as part of the molding of the tray.

Figure 3:
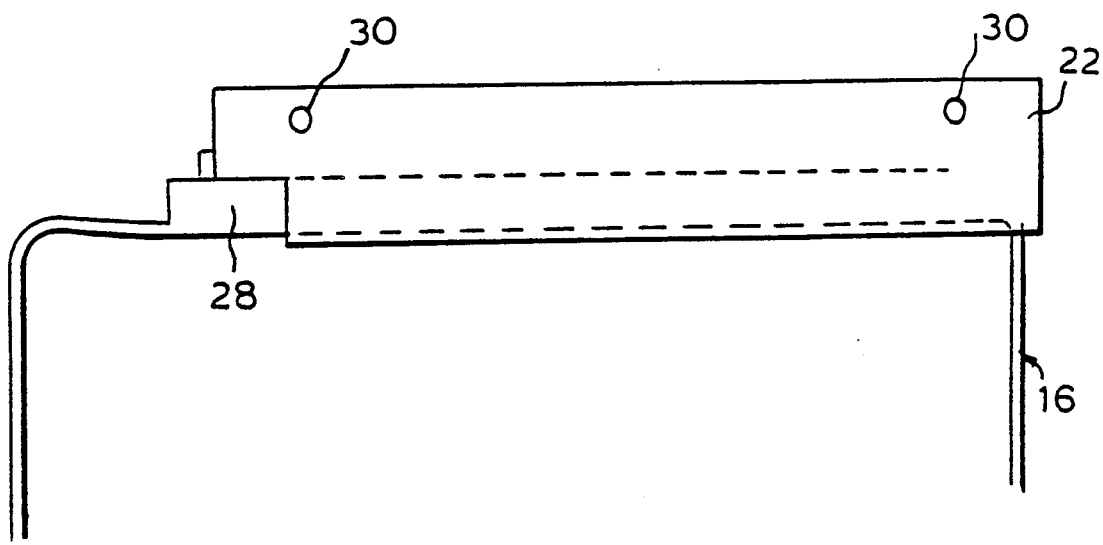
FIG. 3 is a plan view of part of a tray and a corresponding rail from above, before the rail has been attached to a seat.
Figure 4:
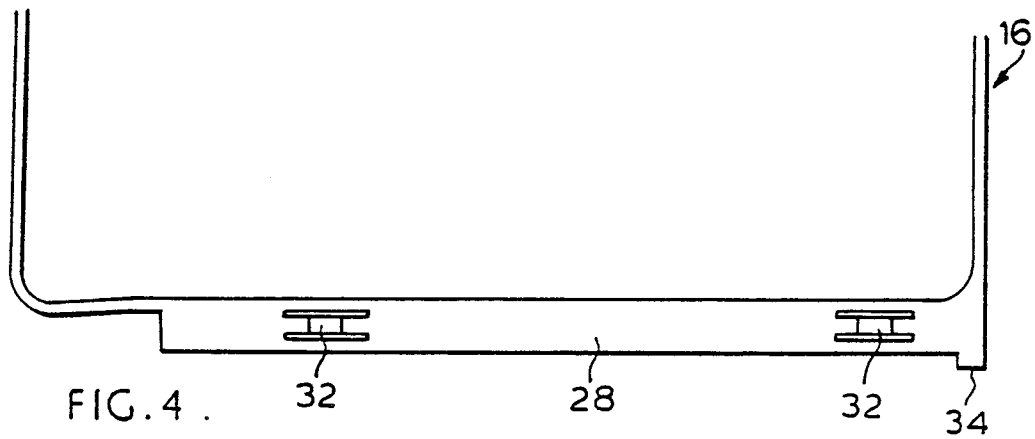
FIG. 4 is a plan view of one side of a tray showing the part which will engage in a rail.
Figure 5:
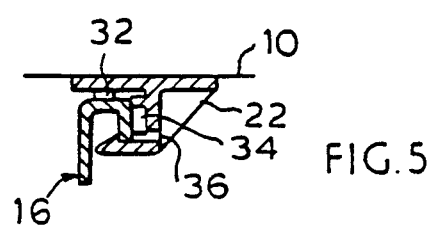
FIG. 5 is a cross-section on the lines V—V from FIG. 1.

The lateral edges of the tray 16 have laterally extending flanges 28 as can be seen in FIG. 3, to engage with the rails 22. A flange on the rails has fixing holes 30 for fixing the rail 22 to the seat 10. FIG. 4 shows that the flanges 28 preferably have raised formations 32 (which can also be seen in FIG. 1) in order eliminate any play between the tray flange 28 and the rails 22. At its rear end, the flange 28 includes a laterally projecting lug 34 which is received for sliding movement along the rails 22 as may best be seen in FIG. 5 and which cooperates with a tapered rear end 35 of the flange 28 to permit the tipping movement of the tray 16 in its extreme forward position.

Also on the rails 22, there is a cut-out 36 which allows dust and other debris to escape from the track.

Figure 6:
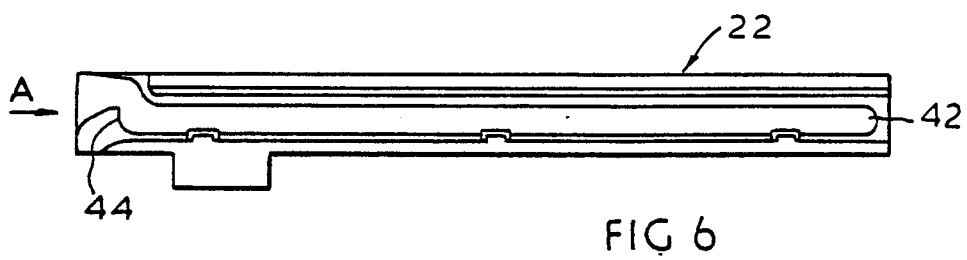
FIG. 6 is a side view of a rail.
Figure 7:
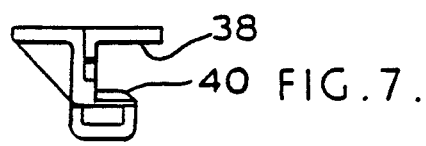
FIG. 7 is an end view of the rail taken in the direction of arrow A from FIG. 6.

The rails 22, as can be seen in FIG. 7, have upper 38 and lower 40 surfaces which define the slide surface for the tray. Also, as may be seen in FIG. 6, in the vertical wall of the rails 22, there is a groove 42 for receiving the lug 34 for sliding and pivotal movement. At the front of the rail 22, this groove 42 follows a dog-leg path, so that when the tray 16 is normally pulled out, its movement will be stopped by abutment of the lug 34 with an upright wall 44. However, if the rear end of the tray 16 is lifted, against the force of a spring 46, then the tray 16 can be removed from the rails 22.

The spring 46 is secured to the front edge of one or both rails 22, as by the offset boss and rivet arrangement indicated at 23 in FIG. 1. This provides a positive lock to hold the tray in its closed position, but a downwardly depending outer part 43 of the flange 28 has a cam-shaped notch 47 for receiving a bent-over portion 45 of the spring 46 which will allow the tray 16 to be pulled forward against the force of the spring 46 which is then cammed downwardly. At the end of the opening movement of the drawer, the bent-over portion 45 of the spring 46 engages in a second notch 48, to prevent withdrawal of the tray in normal operation. A canted face 41 of the notch 48 permits disengagement of the bent-over portion 45 upon rearward movement of the tray 16. Further if the spring 46 is depressed manually, and the spring 46 has a long forward projecting tongue 49 to enable this to be done, then the tray 16 can be removed.

The invention as thus described provides a tray having large storage volume which is easy to load and unload.

While only one embodiment has been described, those skilled in the automotive seating arts will appreciate that others are possible without departing from the scope of the appended claims.

I claim:

1. An underseat stowage tray arrangement for a seat of a motor vehicle, the arrangement comprising:
   a seat base positioned on the underside of the seat;
   a pair of spaced, longitudinally extending rails fixedly secured to the seat base;
   a tray slidably received by the rails for movement with respect to the seat between a rearward closed position and an extreme forward position;
   means operatively disposed between the tray and the rails to permit tipping movement of the front of the tray upon movement to the extreme forward position; and
   a spring secured to at least one of the rails and engaging portions of the tray slidable received in the at least one rail, the spring being manually operable to permit the tray to be disengaged from the rails.

2. An underseat stowage tray as defined in claim 1 and further comprising raised formations defined on contacting surfaces between the tray and the rails for preventing rattling of the tray with respect to the rails.

3. An underseat stowage tray as defined in claim 1 wherein the tray is formed as a Plastic part and further comprising raised formations integrally formed with the tray engageable with the rails for preventing rattling of the tray with respect to the rails.

4. An underseat stowage tray as defined in claim 1 wherein the seat base and the rails are formed as plastic parts and the rails are fixedly secured by heating to the seat base.

5. An underseat stowage tray as defined in claim 4 wherein the tray is formed as a plastic part and further comprising raised formations integrally formed with the tray engageable with the rails for preventing rattling of the tray with respect to the rails.

6. An underseat stowage tray arrangement for a seat of a motor vehicle, the arrangement comprising:
   a seat base positioned on the underside of the seat;
   a pair of spaced, longitudinally extending rails fixedly secured to the seat base;
   a tray slidably received by the rails for movement with respect to the seat between a rearward closed position and an extreme forward position;
   means operatively disposed between the tray and the rails to permit tipping movement of the front of the tray upon movement to the extreme forward position;
   a spring secured to at least one of the rails;
   flange portions formed on the tray and slidable received in the rails and having portions engageable with the spring; and
   a plurality of notches formed in the at least one of the flange portions slidingly engaged with the at least one rail engageable with the spring to:
   hold the tray in the closed position;
   release the tray form the closed position solely upon forward movement of the tray;
   hold the tray in a position intermediate the closed position and the extreme forward position;
   release the tray from the intermediate position solely upon rearward movement of the tray, and
   permit disengagement of the tray from the rails.

7. An underseat stowage tray arrangement for a seat of a motor vehicle, the arrangement comprising:
   a seat base positioned on the underside of the seat;
   a pair of spaced, longitudinally extending rails fixedly secured to the seat base;
   a tray slidably received by the rails for movement with respect tot he seat between a rearward closed position and an extreme forward position;
   means operatively disposed between the tray and the rails to permit tipping movement of the front of the tray only upon movement to the extreme forward position; and
   a spring secured to at lest one of the rails and engaging portions of the tray slidably received in the at least one rail, the spring being manually operable to permit the tray to be disengaged from the rails.

* * * * *